United States Patent [19]

Gosswiller

[11] 4,189,709
[45] Feb. 19, 1980

[54] MODULAR HOUSING ASSEMBLY FOR VEHICLE WARNING LIGHT SYSTEM

[75] Inventor: Earl W. Gosswiller, Clarendon Hills, Ill.

[73] Assignee: Federal Signal Corporation, Oak Brook, Ill.

[21] Appl. No.: 869,286

[22] Filed: Jan. 13, 1978

[51] Int. Cl.² .................. B60Q 1/46; B60Q 1/00; F21Q 1/00; F21V 5/00; F21V 17/00; F21M 3/22

[52] U.S. Cl. ........................... 340/84; 34/50; 34/87; 362/217; 362/219; 362/223; 362/224; 362/225; 362/234; 362/237; 362/238; 362/239; 362/240; 362/241; 362/297; 362/311; 362/331; 362/332; 362/362; 362/363; 362/367

[58] Field of Search ................. 340/50, 84, 87, 81 R; 362/236–241, 244–245, 311, 301, 302, 362, 363, 227, 367, 812, 219, 217, 223–225, 234

[56] References Cited

U.S. PATENT DOCUMENTS

| | | | |
|---|---|---|---|
| 2,291,488 | 7/1942 | Naysmith | 362/222 |
| 2,304,445 | 12/1942 | Doane | 362/367 |
| 2,744,190 | 5/1956 | Kilemnik | 362/223 |
| 2,770,717 | 11/1956 | Schwartz et al. | 362/222 |
| 2,968,025 | 1/1961 | Owens | 340/87 |
| 3,404,371 | 10/1968 | Gosswiller | 340/87 |
| 3,408,624 | 10/1968 | Kennelly | 340/87 |
| 3,803,402 | 4/1974 | Nasu | 362/363 |
| 3,803,403 | 4/1974 | Hasegawa | 362/363 |
| 4,058,794 | 11/1977 | Menke | 340/84 |
| 4,104,614 | 8/1978 | Litman | 340/50 |

FOREIGN PATENT DOCUMENTS

| | | | |
|---|---|---|---|
| 116183 | 2/1930 | Austria | 362/240 |
| 189716 | 4/1957 | Austria | 362/224 |
| 2010342 | 9/1971 | Fed. Rep. of Germany | 362/236 |

*Primary Examiner*—Benjamin R. Padgett
*Assistant Examiner*—T. S. Gron
*Attorney, Agent, or Firm*—Charles F. Pigott, Jr.

[57] ABSTRACT

A modular housing assembly for housing a vehicle warning light system and intended for mounting across the roof of a police car or other vehicle on which warning lights are required. The housing comprises a plurality of transparent plastic panels of modular construction, there being provided a plurality of front modular panel sections interconnected in side-by-side relation and a plurality of rear modular panel sections interconnected in side-by-side relation, the front and rear panel sections being connected to one another and to a common base member.

14 Claims, 5 Drawing Figures

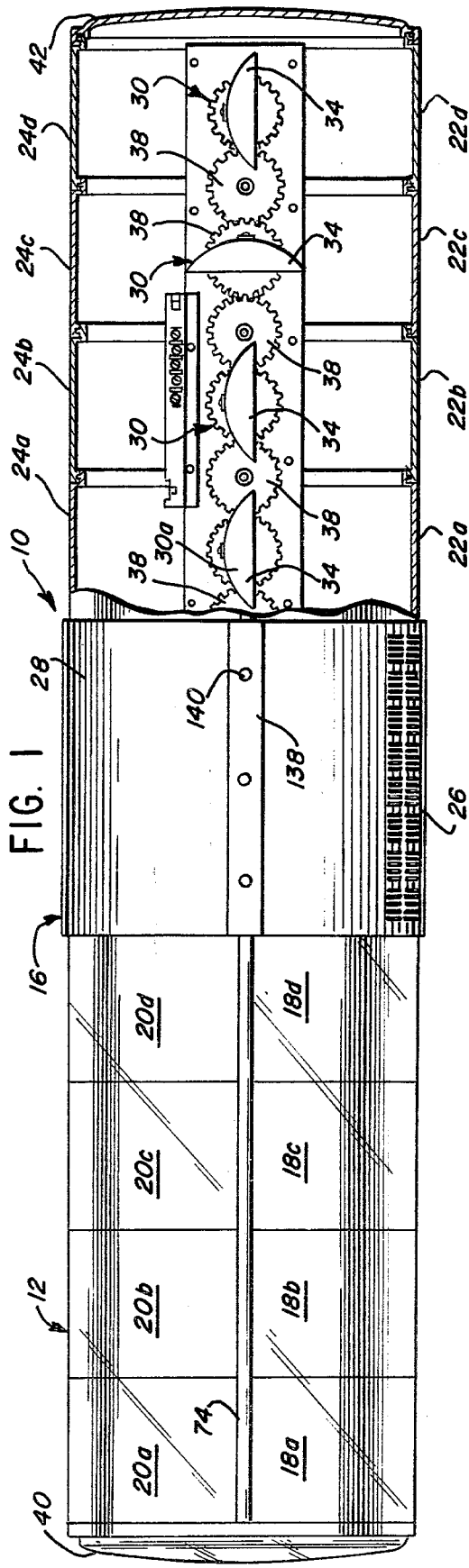
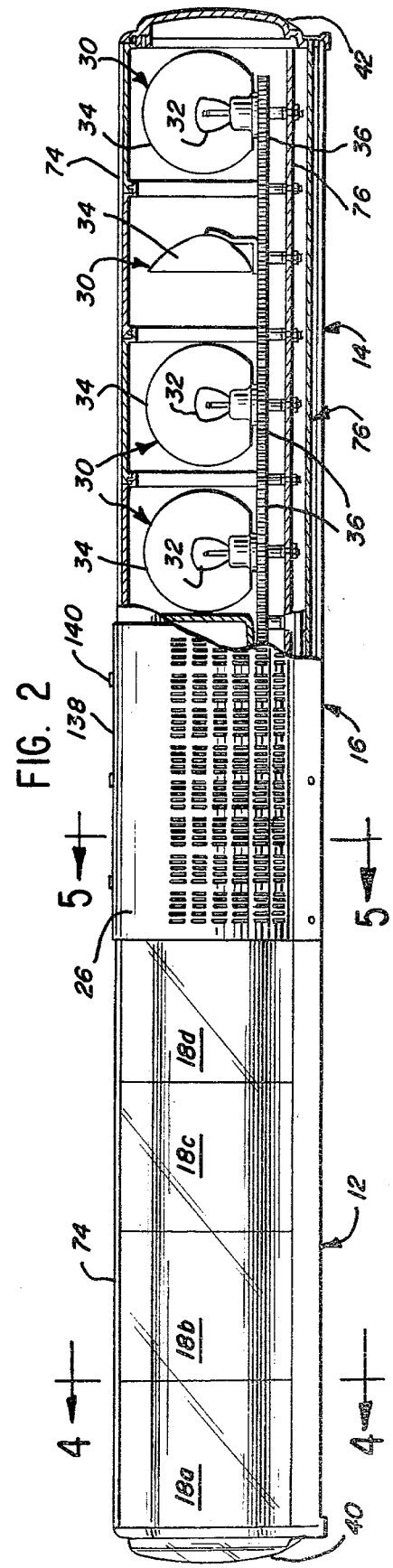

MODULAR HOUSING ASSEMBLY FOR VEHICLE WARNING LIGHT SYSTEM

BRIEF SUMMARY OF THE INVENTION

The present invention relates to a housing for a flashing light warning system for mounting on the roof of a police car or other vehicle where flashing lights are desired for warning purposes. It is well known to mount a flashing light warning system on the roof of a police car or other vehicle. Such warning light systems may contain a plurality of flashing lights, as well as other components such as a siren, and in some systems a remote-controlled searchlight may also be included. It is necessary that the lights and other components be mounted within a housing for protection against the weather, and the housing should include a transparent dome which permits the flashing lights to be highly visible from substantially any direction.

In conventional flashing light warning systems as above described, an elongated housing is provided, as shown for example in my U.S. Pat. No. 3,404,371, granted Oct. 1, 1968, the housing being mounted on the roof of a police car or other vehicle so as to extend transversely across the width of the roof perpendicular to the longitudinal axis of the vehicle. Such a housing may be relatively long so as to extend across the major portion of the width of the vehicle roof.

The housing illustrated in the foregoing patent accommodates two rotating warning lights disposed at opposite ends of the housing, and also a siren located at the center of the housing. The housing of the present invention is designed for use with a lighting system which includes a larger number of flashing lights arranged side-by-side across the width of the vehicle roof, and if desired a siren may be disposed in the center portion of the housing. Such a lighting system is described in detail in my copending patent application, Ser. No. 868,075, filed Jan. 9, 1978.

In a conventional housing as described in my U.S. Pat. No. 3,404,371, the housing walls are fabricated from large sections of transparent plastic material, such as a pair of elongated front and rear wall sections combined with a pair of arcuate end wall sections, a top wall and a bottom wall, the latter two walls normally being flat. It is possible in the fabrication of such a housing to use a different colored plastic for the front and rear walls and for the end walls. For example, the front and rear walls may be of a clear plastic, and the arcuate end walls of a colored plastic, but normally the entire front of the housing and the entire rear thereof are each made of a single sheet of plastic material so as to be uniform in color.

It is an important object of the present invention to provide an improved housing for a vehicle warning light system which housing is comprised of a large number of modular dome panel sections which afford the user a wide choice of color combinations for the different transparent plastic sections of the housing dome. Relative to the foregoing, it is important to understand that the advantage of providing a housing which may have a large number of modular dome sections of different colors is by no means primarily for decorative purposes, but rather serves a very useful function. For example, with reference to the use of special lights on a police vehicle, the color red is believed to be especially effective for a warning light to alert persons in the area of the presence of the vehicle. On the other hand, a blue color is believed most effective for identification purposes, i.e., to identify the vehicle as a police vehicle. Thus, the lights in a lighting system for a police car or other emergency vehicle should desirably perform various functions including warning, identification of the vehicle, illumination, affording distance perception to other vehicles, and so on. For optimum performances of such a multitude of functions, it is believed highly desirable to provide a lighting system which permits many different color combinations.

A more specific object of my invention is to provide a modular housing for a vehicle warning light system which includes both a plurality of front modular dome panel sections arranged side-by-side, and also a plurality of rear modular dome panel sections arranged side-by-side, thereby permitting use of a selected color for each one of a plurality of front and rear dome panels.

Another object of my invention is to provide a modular housing as above described which can be assembled from a variable number of dome panel sections, thereby readily permitting variation in the length of the housing by simply varying the number of modular dome panel sections utilized.

A further object of the invention is to provide a modular housing for a vehicle warning light system as above described which includes improved means for interconnecting the various dome panel sections so as to facilitate assembly of the panels in permanent fashion to provide a highly efficient weather-tight seal for the lights and other components housed therein.

An additional one of my objects is to provide a highly streamlined housing for a vehicle light system which when mounted across the roof of a vehicle will offer an unusually low wind resistance and thereby significantly increase the gas mileage obtained by the vehicle.

The foregoing and other objects and advantages of the invention will be apparent from the following description of a preferred embodiment, taken in conjunction with the accompanying drawings.

DESCRIPTION OF THE DRAWINGS

FIG. 1 is a top plan view of a modular housing of a vehicle warning light system constructed in accordance with the present invention, the housing being partly broken away to illustrate the lights and other interior components;

FIG. 2 is a front elevational view of a modular housing in accordance with the present invention, the housing again being partly broken away to illustrate the interior components;

Figure 3:
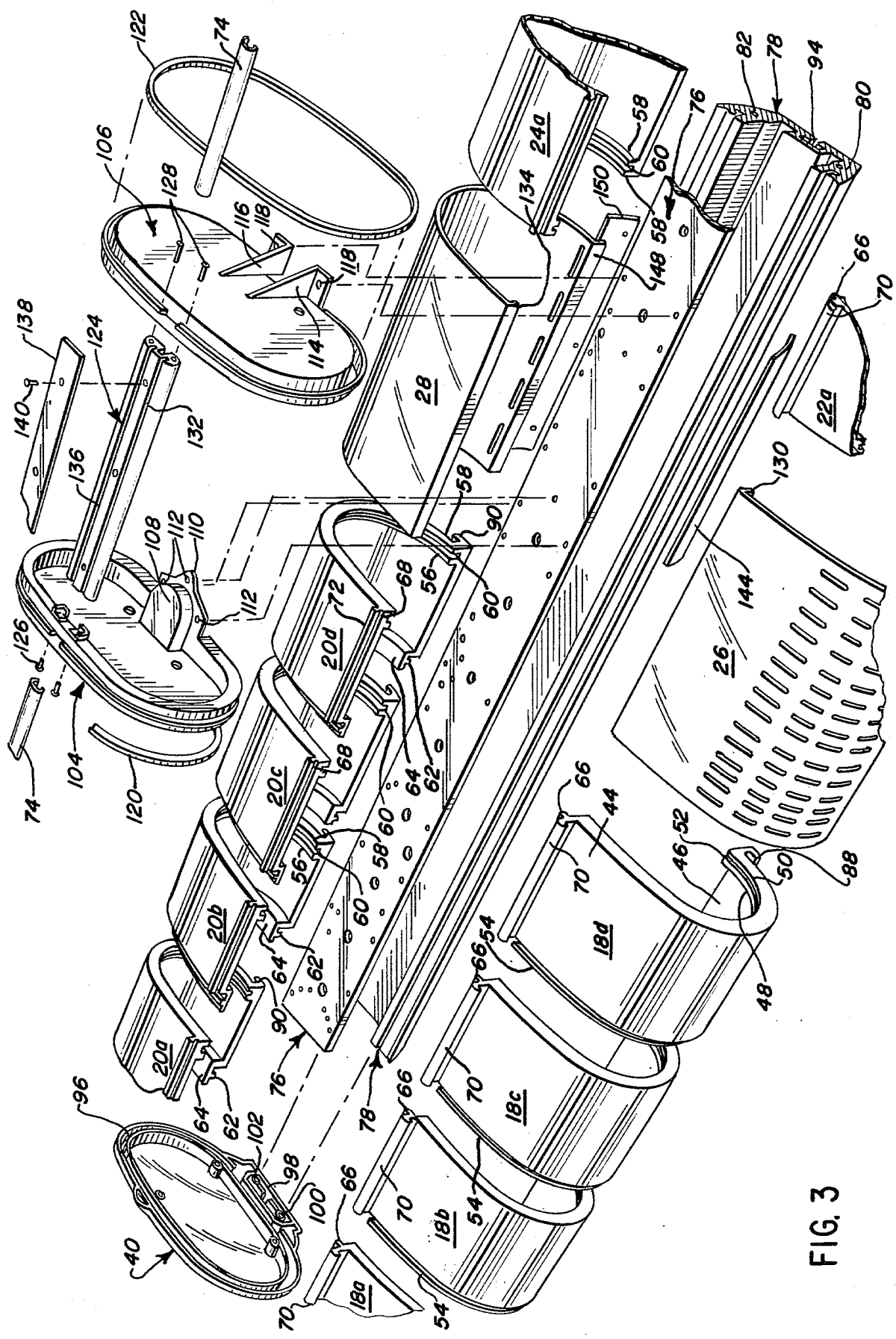
FIG. 3 is a fragmentary exploded perspective view showing a modular housing constructed in accordance with my invention.

Now, in order to acquaint those skilled in the art with the manner of making and using my invention, I shall describe, in conjunction with the accompanying drawings, a preferred embodiment of the invention.

DETAILED DESCRIPTION OF THE INVENTION

Referring now to the drawings, and in particular to FIGS. 1 and 2, there is shown a housing 10 comprising a left-hand housing portion 12, a right-hand housing portion 14, and a center housing portion 16. The left-hand housing portion 12 comprises four front dome panel sections 18a, 18b, 18c and 18d, and four rear dome panel sections 20a, 20b, 20c and 20d. The right-hand housing portion 14 is similar in construction and comprises four front dome panel sections 22a, 22b, 22c and 22d, and four rear dome panel sections 24a, 24b, 24c and 24d. The center housing portion 16 comprises a front perforated grille section 26 and a rear grille section 28.

It will be understood that the present invention is not limited with respect to the particular components contained within the housing 10. However, by way of example, the embodiment described herein includes four flashing light assemblies in the left-hand housing section 12, four flashing light assemblies in the right-hand housing section 14, and a siren is intended for mounting in the center housing portion 16. FIGS. 1 and 2 illustrate four individual light assemblies 30 in the right-hand housing portion 14, each light assembly including a stationary light bulb 32 and a parabolic reflector 34 which is rotatable about the vertical axis of the light. Each of the reflectors 34 is mounted on a corresponding spur gear 36, and idler gears 38 are interposed between the spur gears 36. Such gears and other drive components (not shown) are for the purpose of effecting conjoint rotation of the reflectors 34 to produce a desired sequence of light flashes.

The light system briefly described above is described in greater detail in my above-mentioned copending patent application Ser. No. 868,075. For present purposes, it will simply be noted that the modular housing described herein is capable of accommodating a siren (not shown) in the center housing portion 16, and four separate light assemblies in each of the left and right-hand housing portions 12 and 14. It will further be noted that each light assembly 30 is associated with a corresponding front dome panel section and rear dome panel section. For example, with reference to the right-hand housing portion 14 as shown in FIG. 1, the light assembly shown at 30a is disposed behind the front dome panel section 22a and in front of the rear dome panel section 24a. In a similar manner, each of the light assemblies 30 is associated with a corresponding front and rear dome panel section, and as previously explained, a wide choice of color combinations is thus afforded, as any one of the front or rear dome panels may be of a selected color different from adjacent panels. It will however be understood that the various front and rear dome panel sections are intended to be fabricated from transparent plastic, whereas the grille sections are preferably made of metal such as stainless steel and have perforations therein if the center housing portion 16 is used to house a siren. Transparent plastic end caps are also provided to seal the ends of the housing 10, and there are shown end cap members 40 and 42.

The front and rear dome panel sections will now be described in greater detail, and for this purpose reference is now made to FIG. 3. The various front dome panel sections, such as the panels 18a, 18b, 18c and 18d, are of identical modular construction. Accordingly, only the panel section 18d will be described by way of example. The front dome panel section 18d is of arcuate configuration, generally C-shaped, but with the upper wall portion 44 extending further than the lower wall portion 46, as best shown in FIG. 4. Adjacent one side wall of the dome panel section 18d, on the radially inner portion of the panel, there are formed a pair of parallel arcuate ribs 48 and 50 which define therebetween a groove 52 which extends from one end of the panel to the other end thereof in conformity with the arcuate configuration of the panel. Adjacent the opposite side wall of the dome panel 18d, on a radially outer portion of the panel, there is formed a projecting rib 54 which also extends the full length of the panel and is in conformity with the arcuate configuration thereof.

Each of the front dome panel sections 18 and 22 is constructed as described with reference to the panel 18d, and each of the male ribs 54 is dimensioned to fit within the groove 52 of an adjacent panel section. Accordingly, each front panel 18 is connected with an adjacent front panel by assembling the sections together with the male rib 54 of one section fitted within the groove 52 of an adjacent section, and preferably adhesive is also applied to the joint to assure a permanent connection.

The rear dome panel sections 20 are interconnected in the same manner as described above. For example, the rear dome panel 20d has adjacent one side wall thereof a pair of ribs 56 and 58 which define therebetween an internal groove 60 which extends the full arcuate length of the panel, and along the opposite side wall on a radially outer portion of the panel there is formed a male rib 62 which extends the full arcuate length of the panel. The rib 62 is formed on an arcuate wall portion 64 which is offset radially inwardly somewhat from the main radially outer wall of the panel, and a similar construction is utilized with the front dome panels 18. Thus, the rear dome panels 20 are interconnected by assembling the panel sections together with the male rib 62 of one section fitted within the groove 60 of an adjacent panel section.

While the front dome panels 18 and rear dome panels 20 are of the same construction insofar as described hereinabove, they differ in structure at the ends of the top wall portions in order to facilitate interconnection of the front and rear dome panels. Thus, as shown in FIGS. 3 and 4, the upper end wall of each front dome panel 18 is formed with a longitudinal male rib 66, and the upper end wall of each rear panel section 20 is formed with a longitudinal groove 68, the male rib 66 being dimensioned to fit within the groove 68 of an adjacent rear panel. Each front and rear panel section further includes an upwardly projecting longitudinal rib at the end of the top wall as shown at 70 for the front dome panel 18d and at 72 for the rear dome panel 20d in FIG. 3, the ribs 70 and 72 being provided for cooperation with a metal molding strip as described hereinafter.

In the assembly of the modular housing of the present invention, the left-hand housing portion 12 is assembled by first connecting the front panels 18 to each other and the rear panels 20 to each other. The front panels 18a, 18b, 18c and 18d are assembled using the grooves 52 and male ribs 54 as previously described to connect them to one another, and by applying adhesive to the joints to form a permanent connection. In a similar manner, the rear dome panel sections 20a, 20b, 20c and 20d are assembled together in permanent fashion. The subassembly of the four front dome panels 18 may be connected to the sub-assembly of the four rear dome panels 20 at the ends of the top walls thereof by fitting the male rib 66 of each front panel into the corresponding groove 68 of each rear panel, again preferably using adhesive to assure a permanent connection.

In the foregoing manner, the four front dome panels 18 and the four rear dome panels 20 are readily assembled, and a metal molding strip 74 (see FIG. 4) which extends the length of the dome sub-assembly may be applied over the longitudinal ribs 70 and 72 to cover the top centerline of the assembly and further secure the front and rear dome panels together. The right-hand housing portion 14 is assembled in the same manner as the left-hand housing portion 12, and thus will not be separately described herein.

There are also provided as components of the modular housing 10 a metal mounting plate 76 and a metal extrusion 78, both of which extend substantially the full length of the housing. Referring to FIG. 4, the extrusion 78, preferably made of aluminum, includes a front longitudinal portion 80 and a rear longitudinal portion 82, the front and rear portions of the extrusion being symmetrical. The front section 80 includes a generally L-shaped longitudinal groove 84, and the rear section 82 includes a similar longitudinal groove 86, which grooves serve to secure the lower ends of the several front and rear dome panel sections. Thus, as shown in FIG. 4, each of the front dome panel sections 18 is formed at the end of its lower portion with a forwardly projecting lip 88 which extends the full length of the panel and fits within the L-shaped groove 84 in the front portion of the extrusion 78. In a similar manner, each of the rear dome panel sections 20 is formed at the end of its lower portion with a rearwardly projecting lip 90 which extends the full length of the panel and fits within the L-shaped groove 86 in the rear portion of the extrusion 78.

In the foregoing manner, the extrusion 78 interconnects with the lower ends of all of the front dome panels 18 and rear dome panels 20 of the left-hand housing portion 12, and similarly interconnects all of the front and rear panel sections of the right-hand housing portion 14. In order to produce the foregoing assembly, the eight dome panels 18 and 20 are assembled together in the manner previously described, and then one need only slide the left and righthand dome panel sub-assemblies onto the common base extrusion 78 to the positions shown in FIGS. 1 and 2 on opposite sides of the center housing portion 16, the extrusion 78 being interconnected with the panel sections to form a base for the housing assembly.

The above-mentioned mounting plate 76 seats on the top of the extrusion 78, as shown in FIG. 4, and extends the full length thereof, the mounting plate being secured to the top of the extrusion by a plurality of screws or other suitable fastening means. As shown in FIGS. 1 and 2, and as described more fully in my copending patent application Ser. No. 868,075, the warning light assemblies 30 and other components within the housing 10 are mounted on the mounting plate 76, and a space 92 (see FIG. 4) is provided to accommodate wiring and other mechanism for the warning light system. It should also be noted that with the mounting plate 76 secured to the top of the base extrusion 78, a boxlike structure is formed which is quite rigid and well-suited structurally to form a base for the housing assembly. Moreover, the underside of the extrusion 78 includes a slot 94 suitable for receiving a plate or block (not shown) used to secure the housing 10 to the roof of a police car or other vehicle.

Figure 4:
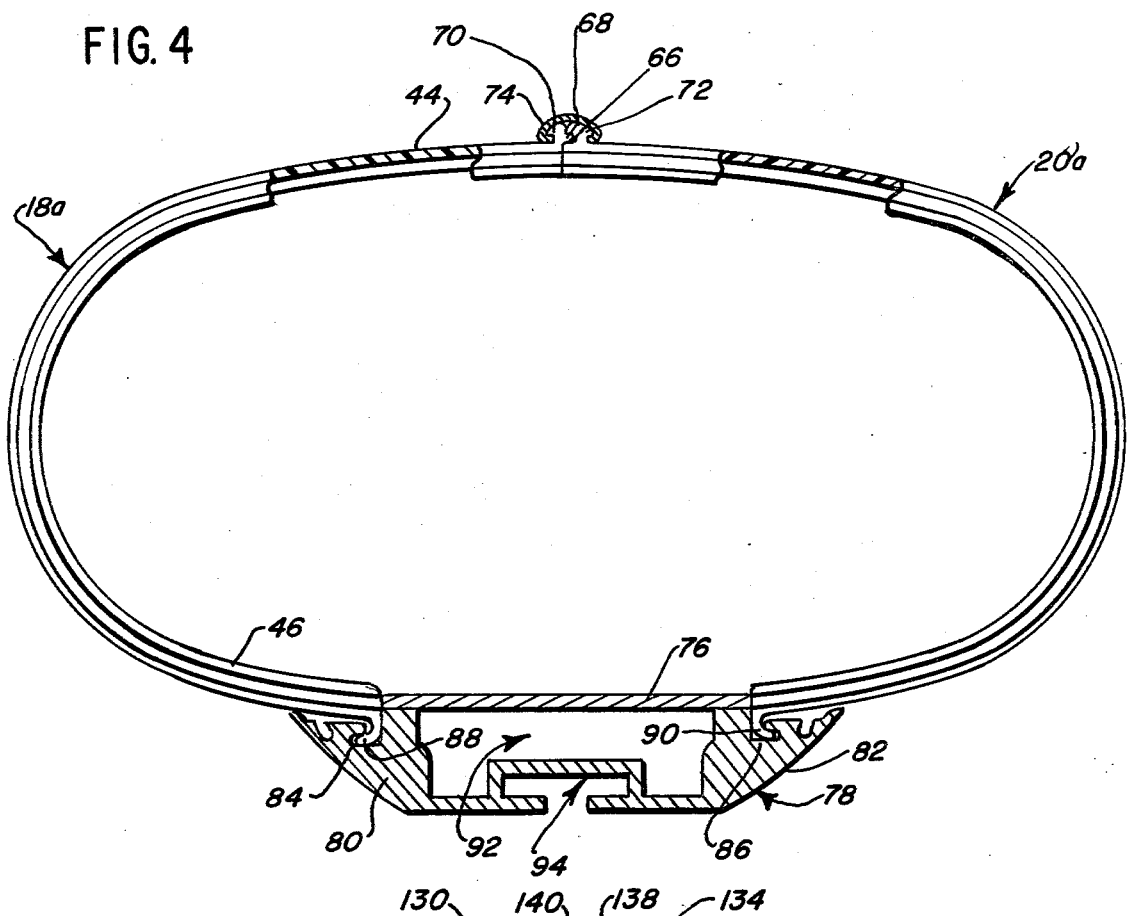
FIG. 4 is an enlarged vertical sectional view taken substantially along the line 4—4 of FIG. 2.

FIG. 3 illustrates the end cap 40 which is of oval configuration in conformity with the cross-sectional shape of the housing 10. The end cap 40 includes a peripheral groove 96 dimensioned to receive the side edge portions of the combined panel sections 18a and 20a so as to fit over the latter. A lower portion 98 of the end cap 40 includes a pair of holes 100 and 102 to receive screws (not shown) for securing the lower portion of the end cap to the adjacent end of the base extrusion 78. The opposite end cap 42 is of similar construction and is secured to the opposite end of the housing 10.

Referring again to FIG. 3, there are shown a pair of bulkheads 104 and 106 which separate the central housing portion 16 from the left and right-hand housing portions 12 and 14. The bulkheads 104 and 106 are desirable to provide added structural strength to the housing assembly, and they also provide a seal between the central housing portion and the left and right-hand housing portions. Such a seal is highly desirable to protect the light assemblies 30 and related components in the two outer housing compartments, because the central compartment 16 is designed to accommodate a siren and thus numerous perforations are formed in the front and rear grille panels 26 and 28.

The bulkhead 104 includes an inwardly extended portion 108 at its lower end which is simply to provide room for one of the idler gears 38 within the housing. Adjacent the lower end of the bulkhead 104, there is a plate portion 110 having openings 112 therein which accommodate screws (not shown) or other fastening devices for securing the bulkhead to the top of the mounting plate 76. The second bulkhead 106 is of the same construction as the bulkhead 104, and as shown in FIG. 3 the outer side of the bulkhead 106 includes two support brackets 114 and 116 having openings 118 at the bottom thereof for further securing of the bulkhead to the mounting plate 76 by screws or other suitable fasteners. The bulkhead 104 is equipped with a peripheral seal 120, and the bulkhead 106 has a similar seal 122, to assure a weather-tight seal is formed between the siren compartment or center housing section 16 and the two outer housing compartments 12 and 14 which accommodate the warning light assemblies 30. An aluminum extrusion member 124 extends between the two bulkheads 104 and 106 at the tops thereof and is secured to the bulkheads by a plurality of screws 126 and 128 which pass through openings near the top of the bulkheads and thread into openings in the opposite ends of the extrusion 124.

Figure 5:
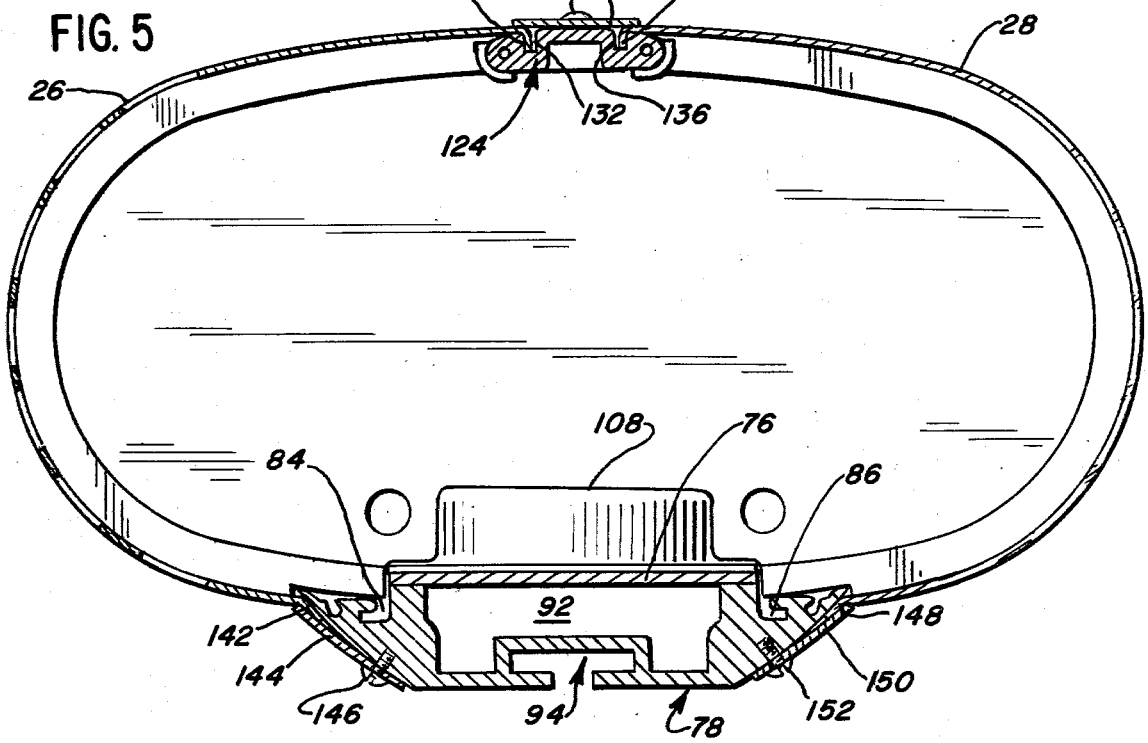
FIG. 5 is an enlarged vertical sectional view taken substantially along the line 5—5 of FIG. 2.

FIG. 5 illustrates the manner in which the arcuate front and rear center grille panels 26 and 28 are secured in position to enclose the center housing portion 16 of the housing assembly 10. The upper end of the front stainless steel grille panel 26 has a bent down portion 130 which is received in a longitudinal slot 132 formed in the top extrusion 124, and the upper end of the rear grille panel 28 has a similar bent down portion 134 received in a second longitudinal slot 136 in the extrusion 124. A top plate 138 is secured to the top of the extrusion 124 by screws 140. The lower end of the front grille panel 26 has a bent portion 142 secured against the front face of the base extrusion 78 by a retaining strip 144 secured to the extrusion by a plurality of screws 146. In a similar manner, the lower end of the rear grille panel 28 has a bent portion 148 held against the rear face of the extrusion 78 by a retaining strip 150 secured to the extrusion by screws 152.

A modular housing assembly as described hereinabove is easily fabricated and assembled, and can readily be modified to produce housings of different lengths for different size vehicles by simply varying the number of modular dome panels utilized and using a base extrusion of desired length. Moreover, with reference to the particular embodiment described herein, there are provided a total of sixteen separate front and rear transparent plastic dome panels, in conjunction with a pair of transparent end caps, each of which affords a choice for color selection, thereby affording the user a wide choice of color combinations to achieve the various functions described hereinabove. By selecting various desired colors such as red, blue, amber, green and clear plastic materials for the various sections of the housing, a multitude of different functions may be achieved by utilizing the modular housing of the present invention in conjunction with a vehicle warning light system.

What is claimed is:

1. A vehicle warning light housing assembly system comprising, in combination, a plurality of transparent plastic front dome panel sections positioned in side-by-side relation and interconnected to one another, a plurality of transparent plastic rear dome panel sections positioned in side-by-side relation and interconnected to one another, said front dome panel sections being connected to said rear dome panel sections at upper edge portions to form a longitudinal joint along the top of said housing assembly, an elongated base member common to said front and rear dome panel sections, and lower ends of said front and rear dome panel sections being connected with said common base member along the length thereof.

2. A housing assembly as defined in claim 1 where said front and rear dome panel sections are of arcuate configuration.

3. A housing assembly as defined in claim 1 where said base member is formed with a pair of parallel longitudinal grooves, said front dome panel sections having lower front edge portions locked in one of said grooves and said rear dome panel sections having lower rear edge portions locked in the other of said grooves.

4. A housing assembly as defined in claim 3 where said front and rear dome panel sections are first interconnected with one another, said dome panel lower front and lower rear edge portions are then inserted into respective ones of said longitudinal grooves at one end of said base member, and said front and rear dome panel sections are then moved conjointly along the length of said base member to desired relative positions.

5. A housing assembly as defined in claim 1 where said front and rear dome panel sections are generally C-shaped in cross-sectional configuration.

6. A housing assembly as defined in claim 3 where said parallel longitudinal grooves are generally L-shaped in cross-sectional configuration, said front dome panel sections having bent lower front edge portions locked in one of said grooves and said rear dome panel sections having bent lower rear edge portions locked in the other of said grooves.

7. A vehicle warning light housing assembly system comprising, in combination, a plurality of transparent plastic front dome panel sections of arcuate cross-sectional configuration positioned in side-by-side relation and interconnected to one another, a plurality of transparent plastic rear dome panel sections positioned in side-by-side relation and interconnected to one another, said front dome panel sections being connected to said rear dome panel sections at upper edge portions to form a longitudinal joint along the top of said housing assembly, an elongated base member common to said front and rear dome panel sections, said front and rear dome panel sections having lower edge portions locked to said common base member along the length thereof, and said housing assembly including at least four front and four rear dome panel sections, selected ones of said dome panel sections being of different colored plastic from other of said dome panel sections.

8. A housing assembly as defined in claim 7 including a centrally located siren compartment, there being provided at least two front and two rear dome panel sections on each side of said compartment.

9. A housing assembly as defined in claim 7 where said front and rear dome panel sections are generally C-shaped in cross-sectional configuration.

10. A housing assembly as defined in claim 7 where said base member comprises a metal extrusion formed with a pair of parallel longitudinal grooves, said front dome panel sections having lower front edge portions locked in one of said grooves and said rear dome panel sections having lower rear edge portions locked in the other of said grooves.

11. A housing assembly as defined in claim 7 where each of said front and rear dome panel sections has formed thereon adjacent one arcuate side edge a male rib which extends substantially from the upper end to the lower end of the panel, and has formed thereon adjacent the opposite arcuate side edge a complementary groove which extends substantially from the upper end to the lower end of the panel, said ribs and grooves serving to interconnect said front dome panel sections to one another in side-by-side relation and said rear dome panel sections to one another in side-by-side relation.

12. A housing assembly as defined in claim 11 where said front dome panel sections and said rear dome panel sections are formed at their mating upper edge portions with one of complementary longitudinal rib and groove means to provide a substantially weather-tight longitudinal joint along the top of said housing assembly.

13. A housing assembly as defined in claim 7 which houses a warning light system including a plurality of individual flashing light assemblies, said housing including a front dome panel section and complementary ear dome panel section positioned adjacent and corresponding to each of said individual light assemblies, selected ones of said dome panel sections being of different colored plastic from other of said dome panel sections.

14. Vehicle warning light housing assembly system including a plurality of individual light assemblies, said housing assembly comprising, in combination, a common mounting plate extending substantially the full length of said housing for supporting said individual light assemblies, a common base extrusion extending substantially the full length of said housing, said mounting plate being positioned approximately in a horizontal plane and secured to the top of said base extrusion, a plurality of transparent plastic front dome panel sections positioned in side-by-side relation and interconnected to one another, a plurality of transparent plastic rear dome panel sections positioned in side-by-side relation and interconnected to one another, said front dome panel sections being connected to said rear dome panel sections at longitudinal upper edge portions to form a longitudinal joint along the top of said housing, said front dome panel sections having lower front edge portions secured to said base extrusion along the length thereof forwardly of said mounting plate, and said rear dome panel sections having lower rear edge portions secured to said base extrusion along the length thereof rearwardly of said mounting plate.

* * * * *